US012749022B1

(12) United States Patent
Atkins et al.

(10) Patent No.: US 12,749,022 B1
(45) Date of Patent: Sep. 29, 2026

(54) ADAPTIVE SPARSE TIME SERIES ENCODING SYSTEM

(71) Applicant: U.S. Bancorp, National Association, Minneapolis, MN (US)

(72) Inventors: Samuel Atkins, Wylie, TX (US); Giacomo Domeniconi, Miami, FL (US)

(73) Assignee: U.S. Bancorp, National Association

( * ) Notice: Subject to any disclaimer, the term of this patent is extended or adjusted under 35 U.S.C. 154(b) by 0 days.

(21) Appl. No.: 19/444,116

(22) Filed: Jan. 8, 2026

(51) Int. Cl.
*G06N 20/00* (2019.01)
*G06F 18/2413* (2023.01)

(52) U.S. Cl.
CPC ......... *G06N 20/00* (2019.01); *G06F 18/2413* (2023.01)

(58) Field of Classification Search
CPC ............................ G06N 20/00; G06F 18/2413
See application file for complete search history.

(56) References Cited

U.S. PATENT DOCUMENTS

2020/0242483 A1 * 7/2020 Shashikant Rao ... G06N 3/0985

OTHER PUBLICATIONS

Li, Jiabao, et al. "Uncertainty-aware self-attention model for time series prediction with missing values." Fractal and Fractional 9.3 (2025): 181. (Year: 2025).*

Guthula, Satyandra, et al. "NetBurst: Event-Centric Forecasting of Bursty, Intermittent Time Series." arXiv preprint arXiv:2510.22397 (2025). (Year: 2025).*

Andersen, Torben G., et al. "Volatility and correlation forecasting." Handbook of economic forecasting 1 (2006): 777-878. (Year: 2006).*

Nestor, Bret, et al. "Feature robustness in non-stationary health records: caveats to deployable model performance in common clinical machine learning tasks." Machine Learning for Healthcare Conference. PMLR, 2019. (Year: 2019).*

Li, Steven Cheng-Xian, and Benjamin M. Marlin. "Classification of Sparse and Irregularly Sampled Time Series with Mixtures of Expected Gaussian Kernels and Random Features." UAI. 2015. (Year: 2015).*

Kamarthi, Harshavardhan, et al. "Large scale hierarchical industrial demand time-series forecasting incorporating sparsity." Proceedings of the 30th ACM SIGKDD Conference on Knowledge Discovery and Data Mining. 2024. (Year: 2024).*

* cited by examiner

*Primary Examiner* — Jennifer N Welch
*Assistant Examiner* — Megan Elizabeth Hwang
(74) *Attorney, Agent, or Firm* — Garg Law Firm, PLLC; Rakesh Garg; Christopher Davis

(57) ABSTRACT

A set of one or more non-transitory computer readable media has instructions that, when executed by a set of one or more processors, cause the processor set to obtain time series data comprising a plurality of data sequences, each data sequence having temporal data points with varying sparsity patterns. The instructions cause the processor set to analyze sparsity characteristics of each data sequence within a rolling window to determine a sparsity pattern classification and select an encoding strategy for each data sequence based on the determined sparsity pattern classification, wherein different encoding strategies are applied to data sequences having different sparsity pattern classifications. The instructions further cause the processor set to generate feature vectors for each data sequence using the selected encoding strategy and train a machine learning model using the generated feature vectors.

30 Claims, 7 Drawing Sheets

ADAPTIVE SPARSE TIME SERIES ENCODING SYSTEM

BACKGROUND

Time series data analysis has become increasingly prevalent across numerous technological domains, including financial markets, healthcare monitoring, industrial sensor networks, and scientific research. Time series data represents sequences of data points collected over time, where each data point corresponds to a measurement or observation at a specific temporal instance. Traditional approaches to time series analysis typically assume that data is collected at regular intervals with complete observations. However, real-world time series data often exhibits irregular sampling patterns, missing values, and varying degrees of sparsity across different data sources or time periods. This sparsity can arise from various factors, including sensor malfunctions, network connectivity issues, cost constraints on data collection, or inherent characteristics of the monitored phenomena.

Machine learning models designed for time series prediction and classification generally require consistent feature representations to achieve optimal performance. When applied to sparse or irregular time series data, conventional feature engineering approaches may produce suboptimal results due to their inability to adapt to varying data availability patterns. Standard techniques such as interpolation, forward filling, or fixed windowing methods apply uniform strategies regardless of the underlying data characteristics.

The challenge of effectively processing sparse time series data has led to various approaches in the field, including specialized neural network architectures, imputation methods, and adaptive sampling techniques. These approaches attempt to handle missing data and irregular sampling patterns while preserving the temporal relationships within the data.

As the volume and variety of time series data continue to grow across technological applications, there is ongoing development in methods that can automatically adapt to different sparsity patterns and data characteristics. Such adaptive approaches aim to extract meaningful features from time series data regardless of its completeness or regularity, thereby enabling more robust machine learning applications across diverse domains.

DETAILED DESCRIPTION

Figure 1:
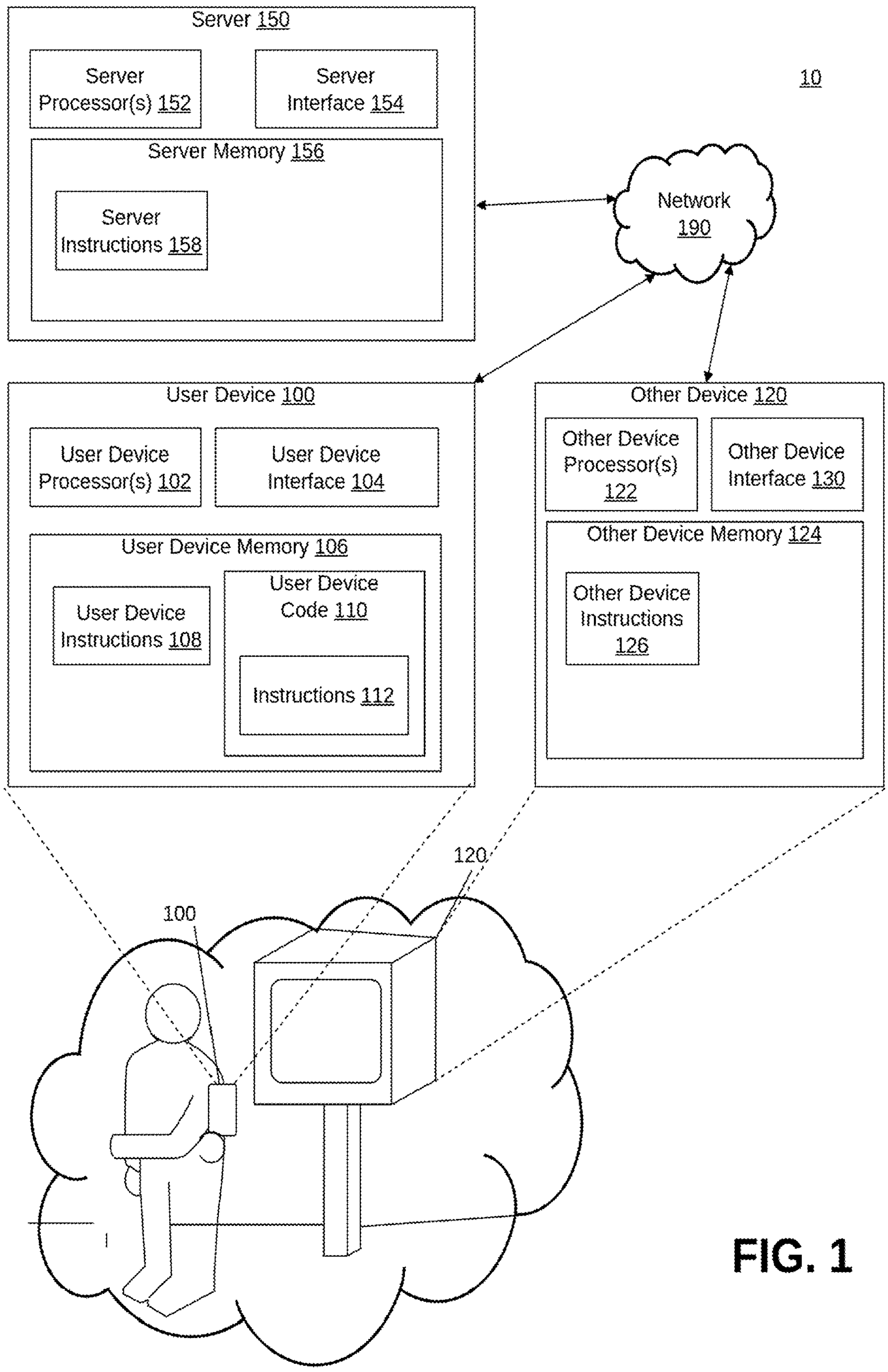
FIG. 1 illustrates a system for adaptive sparse time series encoding, in accordance with some embodiments.

Real-world time-series data presents challenges when multiple data sequences exhibit varying sparsity patterns within the same dataset. Bond pricing markets contain thousands of individual bonds where some bonds trade frequently and generate dense price histories with minimal missing values, while other bonds trade sporadically and produce sparse data sequences with extensive gaps between observations. Healthcare monitoring systems face similar heterogeneity where patient vital sign measurements occur at different frequencies depending on patient condition, with some patients monitored continuously while others have measurements recorded only during periodic visits or emergency situations. Sensor networks deployed across industrial or environmental monitoring applications generate time-series data with varying sparsity characteristics due to factors such as intermittent connectivity, power limitations, equipment failures, or event-driven sampling protocols.

Traditional machine learning approaches apply uniform feature engineering strategies across all data sequences regardless of their underlying sparsity characteristics. These approaches typically implement fixed imputation methods that fill missing values with statistical measures such as mean, median, or last observation carried forward, or apply consistent windowing techniques that extract features using predetermined time intervals. When applied to heterogeneous datasets containing both dense and sparse sequences, uniform strategies produce suboptimal results because the feature engineering techniques optimized for dense data sequences do not capture relevant information from sparse sequences, and conversely, techniques suitable for sparse data underutilize the rich information available in dense sequences.

Dense time-series sequences with abundant data points enable sophisticated feature extraction techniques such as moving averages across multiple time windows, exponential moving averages with varying decay parameters, volatility calculations, trend analysis, and statistical measures that require sufficient data density to produce meaningful results. Sparse time-series sequences with limited data availability require different approaches that focus on extracting maximum information from the few available observations, such as time-elapsed calculations since the last measurement, binary indicators for data presence within specific time periods, and decay-weighted features that account for temporal distance between observations. Burst pattern sequences represent another category of sparsity where measurements occur in clusters separated by extended periods of missing data, such as patient hospital visits that generate intensive monitoring data during admission periods followed by months of no observations. These sequences require specialized feature engineering approaches that analyze characteristics within individual burst periods, calculate statistics across burst episodes, and measure temporal gaps between consecutive bursts to capture the underlying pattern structure.

The adaptive sparse time series encoding technology described herein addresses these technical challenges by automatically analyzing sparsity characteristics of individual data sequences within rolling time windows and selecting appropriate encoding strategies based on determined sparsity pattern classifications. The technology categorizes each data sequence into sparsity pattern types such as dense, sparse, intermediate, or burst patterns based on metrics including percentage of missing values, regularity of observation intervals, and identification of temporal clustering patterns. Different feature engineering techniques are then applied to each category to optimize information extraction from the available temporal data points.

The rolling window approach facilitates dynamic adaptation to changing sparsity patterns within individual data sequences over time, where a sequence that exhibits dense characteristics during one time period transitions to sparse characteristics during another period due to changing underlying conditions or data collection processes. This adaptive capability allows the encoding system to respond to temporal variations in data availability rather than applying static classifications based on historical sequence characteristics. The technology generates separate feature matrices for each sparsity pattern classification, where dense sequences produce feature vectors containing moving averages, volatility measures, and trend indicators, while sparse sequences generate feature vectors with most recent values, time-elapsed calculations, and presence indicators. These homogeneous feature matrices enable training of specialized machine learning models optimized for each sparsity pattern type, improving predictive performance compared to approaches that attempt to handle heterogeneous sparsity patterns with single models or uniform feature engineering strategies.

An example system that can be used according to examples herein is described in FIG. 1. FIG. 1 illustrates a system 10 configured to perform adaptive sparse time series encoding across multiple networked computing devices. The system 10 enables distributed processing of time series data with varying sparsity patterns by coordinating operations between a user device 100, another device 120, and a server 150 through a network 190. This distributed architecture allows the system 10 to handle large volumes of heterogeneous time series data by leveraging the computational resources of multiple devices, where each device can specialize in different aspects of the sparsity analysis, feature engineering, and model training processes based on their respective capabilities and the specific requirements of the adaptive sparse time series encoding methodology.

The user device 100 can be a personal computing device, such as a smart phone, tablet, laptop computer, or desktop computer, that can be used as part of processes described herein. The user device 100 includes a user device processor set 102, a user device interface set 104, and a user device memory set 106. The user device processor set 102 executes instructions to obtain data, process the data, and provide output based on the processing. The user device interface set 104 facilitates receiving input from and providing output to external components. The user device memory set 106 stores instructions and data for later retrieval and use, including user device instructions 108 and user device code 110 with instructions 112.

The user device instructions 108 are a set of instructions that, when executed by the user device processor set 102, cause the processor set to perform operations described herein. The instructions 112 can be those of a mobile application obtained from a mobile application store or instructions that cause a web browser to render a web page associated with the processes. The user device 100 can collect or receive time series data (e.g., data received at different points in time) from various data sources or devices. Examples of types of time series data include patient data, sensor data (e.g., different types of sensors that monitor aspects of a building), polling data, financial data, web and user activity data, industrial data (e.g., machine vibration levels in a factory), communication data (e.g., call records and durations), transportation and location data, sleep pattern tracking, etc. The user device 100 can execute user device instructions 108 to perform initial sparsity pattern analysis within a rolling window time window on the different types of time series data.

The other device 120 is a computing device that serves as an additional processing node or data source within the adaptive sparse time series encoding system 10. The other device 120 includes an other device processor set 122, an other device memory set 124, and an other device interface set 130. The other device processor set 122 executes other device instructions 126 to perform operations described herein. The other device memory set 124 stores instructions and data for later retrieval and use. The other device interface set 130 facilitates receiving input from and providing output to external components.

The other device 120 can function as a specialized sensor data collection device, a secondary processing unit for handling specific sparsity pattern analysis tasks, or a data repository that stores historical time series data. The other device 120 may perform preliminary sparsity classification operations on incoming time series data before transmitting the classified data to the server 150 or serve as a distributed computing resource that handles specific encoding strategies for particular sparsity patterns, enabling parallel processing of heterogeneous time series data.

The server 150 functions as the primary processing hub and includes a server processor set 152, a server interface set 154, and a server memory set 156. The server processor set 152 executes server instructions 158 to obtain data, process the data, and provide or generate output based on the processing. The server interface set 154 facilitates receiving input from and providing output to external components. The server memory set 156 stores instructions and data for later retrieval and use, including server instructions 158 that implement the adaptive encoding strategies and train separate machine learning models for different sparsity classifications.

The network 190 is a set of devices that facilitate communication from a sender to a destination, such as by implementing communication protocols. Example networks 190 include local area networks, wide area networks, intranets, or the Internet. Communication between the distributed components occurs through the network 190, which facilitates data exchange and coordination of processing tasks across all devices in the system 10.

As described herein, the system 10 architecture enables distributed processing of adaptive sparse time series encoding by allocating computational workloads based on device capabilities and processing requirements. The distributed architecture provides computational scalability for processing large volumes of heterogeneous time series data by leveraging the combined processing power of all processor sets. The user device processor set 102 executes initial data preprocessing and sparsity classification operations, while the server processor set 152 executes computationally intensive adaptive encoding algorithms and model training procedures. The other device processor set 122 supports parallel processing of specific sparsity pattern types or handles specialized encoding strategies for particular application domains. The memory components provide distributed storage for instructions, data, and intermediate processing results across the networked devices. The interface sets enable data transmission and coordination, with the user device interface set 104 transmitting classified sparsity pattern data to the server 150, the server interface set 154 receiving data from multiple sources and distributing processing results, and the other device interface set 130 enabling participation in the distributed processing workflow.

The system 10 architecture supports various application domains that require processing of time series data with heterogeneous sparsity patterns. In one example, in bond pricing applications, the system 10 processes thousands of individual bond price sequences where some bonds exhibit dense trading patterns with frequent price updates while others demonstrate sparse patterns with infrequent trading activity. In another example, for credit card fraud detection applications, the system 10 analyzes transaction patterns where certain customers generate dense transaction data through frequent purchases while other customers exhibit burst patterns during specific time periods. In another example, in healthcare applications, the system 10 processes patient visit data where some patients have regular appointment schedules generating dense temporal sequences while others visit healthcare providers sporadically. In another example, for IoT sensor monitoring applications, the system 10 handles sensor data where different sensors exhibit varying connectivity patterns due to power limitations, network availability, or environmental conditions.

Figure 2:
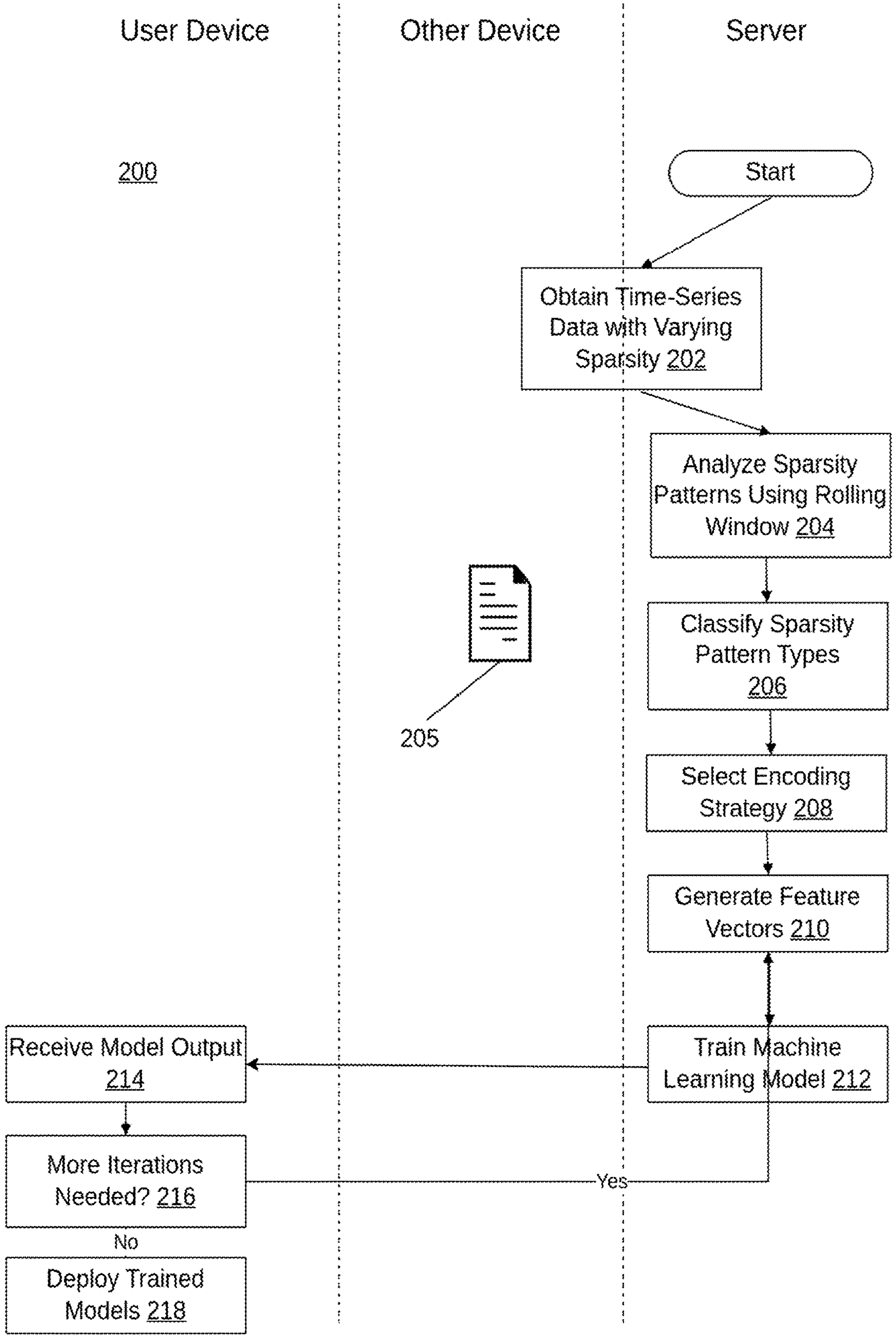
FIG. 2 illustrates an example method for adaptive sparse time series encoding, in accordance with some embodiments.

FIG. 2 illustrates an example method 200. The method 200 can include any number of operations and the operations can be performed in any order. The method 200 can be performed by a data processing system, such as any of the computers described with reference to FIG. 1. The method 200 begins with operation 202, which includes obtaining time-series data with varying sparsity patterns from multiple data sources. The time-series data can include a plurality of data sequences with temporal data points that exhibit different degrees of missing values and irregular sampling intervals. Examples of the types of the data points can include health measurements (e.g., blood pressure measurements, body temperature measurements, etc.), patient visits, sensor measurements, communication network signals, etc. The data processing system can receive the different types of time series data over time. Following operation 202, the flow of the method 200 moves to operation 204.

Operation 204 includes analyzing sparsity patterns using a rolling window approach, where the system examines each data sequence within a predetermined time window (e.g., a time window of a defined length ending at the current time or otherwise a defined time) to calculate sparsity metrics such as percentage of missing values, regularity of observation intervals, and identification of burst patterns characterized by clusters of measurements separated by extended gaps. The system can calculate such metrics using stored counters and/or functions that are specific to each sparsity metric. The rolling window approach enables dynamic assessment of sparsity characteristics by evaluating data availability within fixed-size temporal segments that slide across the time series, allowing the system to adapt to changing sparsity patterns within individual sequences over time. The sparsity metrics include percentage of missing values within the rolling window, consecutive missing values (also referred to as consecutive NANs), and systematic patterns like weekend gaps or holiday gaps in business data. While complex windowing techniques exist, empirical evaluation demonstrates that straightforward metrics such as percentage of missing values and consecutive missing value counts provide sufficient discriminatory power for effective sparsity pattern classification while maintaining computational efficiency. Following operation 204, the flow of the method 200 moves to operation 206.

Operation 206 includes classifying sparsity pattern types based on the analysis performed in operation 204. The system can categorize each data sequence into one of multiple sparsity classifications, such as dense patterns for sequences with less than twenty percent missing values, sparse patterns for sequences with more than seventy percent missing values, and intermediate patterns for sequences with missing values between twenty and seventy percent. The system can categorize the different data sequence into the sparsity classifications using rules specific to each sparsity classification. For example, the classification process can identify burst patterns based on consecutive missing value metrics and systematic gap patterns based on temporal regularity rules. These quantitative rules enable automatic categorization without requiring manual analysis or domain expertise. Following operation 206, the flow of the method 200 moves to operation 208.

Operation 208 includes selecting an encoding strategy for each data sequence based on the determined sparsity pattern classification. Feature engineering techniques can be chosen to optimize information extraction from each sparsity pattern type. Dense sequences receive encoding strategies that leverage abundant data availability through moving averages across multiple temporal windows, exponential moving averages with varying decay factors, and volatility measures. Sparse sequences can correspond to encoding strategies that maximize information extraction from limited available observations through most recent measurement values, time-elapsed calculations since the last observation, and binary presence indicators for measurements within predefined time intervals. Intermediate sequences receive hybrid encoding strategies that balance statistical feature extraction with techniques suitable for handling data gaps. Following operation 208, the flow of the method 200 moves to operation 210.

As used herein, an “encoding strategy” refers to a set of transformations that convert a raw time-series data sequence, which may be irregularly spaced and contain missing values, into a structured feature representation suitable for ingestion by downstream analytic or machine learning models. The encoding strategy selected for a given data sequence dictates the manner in which temporal relationships, measurement values, and absence of measurements are mathematically represented in a fixed-length feature vector. By applying an encoding strategy, the system preserves relevant temporal and statistical characteristics of the original measurements while eliminating the irregularities that inhibit the direct use of the raw data sequence. These strategies can incorporate aggregations, trend calculations, gap-aware metrics, decay-weighted averages, and categorical indicators, each chosen to maximize the informational content extracted from the data sequence in accordance with its sparsity classification.

The system can select an encoding strategy for a given data sequence by first computing one or more quantitative metrics describing the sequence’s observation characteristics, such as measurement density over a defined temporal window, regularity of observation intervals, presence and duration of gaps exceeding predefined thresholds, and statistical indicators of burst or cluster patterns. The system can input these into a classification model (e.g., a machine learning model, such as a neural network, a random forest, a support vector machine, etc., trained to generate sparsity classifications for data sequences) that assigns the data sequence to a sparsity pattern category, such as sparse, dense, or intermediate density, or to a more granular subclass (e.g., sparse-irregular, dense-regular, burst-pattern). Based on the assigned sparsity pattern classification, the system can query a mapping of classifications to pre-configured encoding strategies and retrieve the corresponding strategy definition from the mapping. The retrieved encoding strategy can specify the transformations, aggregations, and gap-handling techniques to be executed on the sequence in order to produce the dense feature representation. This selection process can be repeated independently for each data sequence, thereby enabling the system to apply heterogeneous encoding strategies within the same dataset.

In an example, an encoding strategy applied to a sparse data sequence (e.g., a data sequence classified as “sparse”) may compute: (i) the most recent observed measurement value; (ii) the number of elapsed days or other qualified time units since the last observation; (iii) a binary indicator flag representing whether a measurement was recorded within a predetermined recent time interval (e.g., 30 days); and (iv) a long-term average that is attenuated by a temporal decay function to emphasize more recent observations. Conversely, an encoding strategy for a dense data sequence (e.g., a data sequence classified as “dense”) may compute: (i) simple moving averages over multiple window lengths (e.g., 3-day, 7-day, and 30-day windows); (ii) exponential moving averages using different decay rates to capture short-term and long-term trends; (iii) rolling standard deviations to measure volatility; and (iv) temporal deltas between consecutive measurements to characterize short-period changes. A hybrid encoding strategy for an intermediate-density sequence (e.g., a data sequence classified as “hybrid”) may combine elements from both sparse and dense strategies, such as applying moving averages over sequential segments while also including gap-specifying features to ensure the model accounts for intermittent missing data.

Operation 210 includes generating feature vectors for each data sequence using the selected encoding strategy for the data sequence. The adaptive encoding process can transform the raw time-series data into dense feature representations that capture the relevant information based on the specific sparsity characteristics of each sequence. The generated feature vectors enable downstream machine learning algorithms to process the encoded information without requiring specialized handling of missing values or irregular sampling patterns. Following operation 210, the flow of the method 200 moves to operation 212.

For example, the system can identify a plurality of time-series data sequences within a dataset, each exhibiting different sparsity characteristics. The system can classify each data sequence select an encoding strategy for the different sequences based on the respective classifications. For a sequence classified as sparse-irregular, the system generates a feature vector by computing the most recent observed value, calculating the elapsed time since that value was recorded, deriving a decay-weighted average that emphasizes more recent observations, and setting a binary flag to indicate whether any measurement occurred within a predetermined recent interval. The system includes each computed value in the feature vector for the sequence. For a sequence classified as dense-regular, the system generates a feature vector by calculating moving averages over multiple temporal window lengths, computing exponential moving averages with varied decay factors to capture short-term and long-term trends, and determining rolling volatility measures that quantify variability over recent periods. For a sequence classified as burst-pattern, the system generates a feature vector by aggregating statistics within the most recent burst of observations, counting the number of measurements in that burst, calculating the gap duration since the prior burst, and computing trend indicators for the burst interval. In some cases, the calculated values for the different sequences are the only values in the sequences. Thus, the system can transform the raw, irregular data into a fixed-length, fully-populated numerical representation that downstream machine learning or statistical models can ingest without specialized handling for missing values or non-uniform sampling intervals. Operation 212 includes training a machine learning model using the generated feature vectors, where the system partitions the feature vectors into separate datasets based on sparsity pattern classification and trains individual models for each classification to optimize predictive performance for heterogeneous time-series data. For example, feature vectors classified as sparse-irregular are grouped into a first dataset, feature vectors classified as dense-regular are grouped into a second dataset, and feature vectors classified as burst-pattern are grouped into a third dataset. The system can train a separate machine learning model for each dataset, selecting model architectures and hyperparameters tailored to the statistical characteristics and temporal dynamics of the classification group.

In an example, the system may train machine learning models for temperature forecasting using data from multiple environmental sensing sources. One dataset can contain dense-regular sequences from fixed-location weather stations that record temperature readings at uniform hourly intervals. The system initializes the weights of a first machine learning model and processes the encoded feature vectors from this dataset to produce predicted future temperature values, computes the error against actual recorded temperatures using a mean squared error loss function, and applies backpropagation to update model parameters of the first machine learning model. In parallel, the system processes a second dataset comprising sparse-irregular sequences from satellite-based remote sensing instruments that capture temperature data infrequently and at varying time intervals due to orbital pass schedules and cloud cover. For this dataset, the system selects a second machine learning model configured to process encoded feature vectors of sparse data and trains the second machine learning model using the corresponding encoded feature vectors.

The separate training approach enables each model to specialize in processing feature vectors derived from specific sparsity patterns, improving prediction accuracy compared to approaches that attempt to handle all sparsity types with a single model. Following operation 212, the flow of the method 200 moves to operation 214.

Operation 214 includes receiving model output from the trained machine learning models, where the system obtains predictions or classifications based on the processed feature vectors and evaluates the performance of the adaptive encoding approach using metrics such as prediction accuracy, mean squared error, or classification precision and recall. Following operation 214, the flow of the method 200 moves to operation 216.

Operation 216 includes determining whether additional training iterations are required based on model performance metrics and convergence criteria. If additional training iterations are determined to be beneficial, the method 200 returns to operation 210 to generate additional feature vectors or refine existing feature vectors based on updated encoding strategies. If the model performance satisfies the convergence criteria, the flow of the method 200 moves to operation 218.

Operation 218 includes deploying the trained models for inference, where the system makes the individual models available for processing new time-series data based on automatic classification of incoming data sequences into corresponding sparsity patterns. The deployed system receives new time-series data, performs sparsity pattern analysis using the same rolling window approach and metrics established during training, classifies the new data sequences into appropriate sparsity categories, and routes each sequence to the corresponding specialized model for prediction or analysis tasks.

The method 200 provides a comprehensive approach for adaptive sparse time series encoding that automatically processes heterogeneous temporal data sequences with varying sparsity characteristics. In some examples, the time-series data includes financial market data such as bond prices where different securities exhibit varying trading frequencies, healthcare monitoring data where patient measurements occur at irregular intervals, or sensor network data where different devices report measurements based on connectivity availability or event-driven triggers. The sparsity pattern classification system establishes quantitative thresholds or rules that enable automatic categorization of data sequences based on their missing value characteristics within the rolling window analysis. In some examples, dense pattern sequences contain less than twenty percent missing values, indicating sufficient data availability to support sophisticated feature engineering techniques such as moving averages across multiple time periods, exponential moving averages with varying decay parameters, volatility calculations, and trend analysis techniques. Sparse pattern sequences contain more than seventy percent missing values, necessitating feature engineering approaches that focus on the most recent available measurements, time-elapsed calculations since the last observation, and binary presence indicators. Intermediate pattern sequences contain between twenty and seventy percent missing values, requiring hybrid encoding strategies that balance statistical feature extraction with techniques suitable for handling data gaps, applying burst-level statistics when available data points cluster in temporal groups. The classification thresholds provide consistent and reproducible categorization of data sequences across different application domains and temporal periods, enabling standardized processing of heterogeneous time series data regardless of the underlying causes of missing values or irregular sampling patterns. The automatic selection process matches encoding strategies to sparsity classifications by evaluating the percentage of missing values and applying predetermined mapping rules that associate each classification with optimized feature engineering techniques, enabling the development of specialized machine learning models for each sparsity classification that generalize across multiple datasets while maintaining optimized performance for their respective sparsity patterns.

Figure 3:
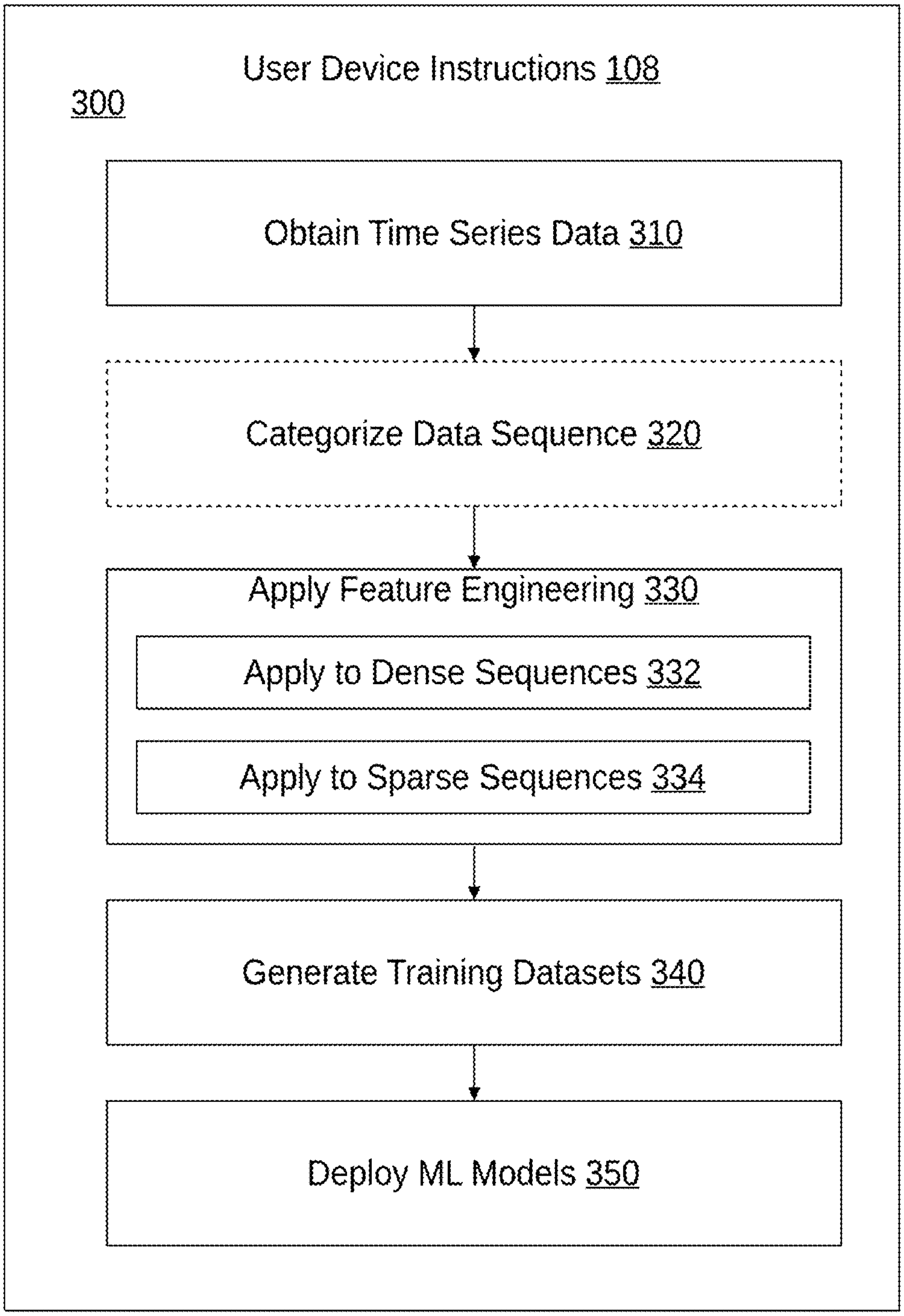
FIG. 3 illustrates an example method for adaptive sparse time series encoding, in accordance with some embodiments.

FIG. 3 illustrates an example method 300 that can be performed by executing the user device instructions 108. The method 300 can include any number of operations and the operations can be performed in any order. The method 300 can be performed by a data processing system, such as any of the computers described with reference to FIG. 1. Operation 310 includes obtaining time series data comprising multiple data sequences with varying sparsity patterns, where the system receives raw temporal data that exhibits different degrees of missing values, irregular sampling intervals, and heterogeneous data availability characteristics across the different sequences. The system can obtain the time series data in the same manner as described with reference to operation 202 of the method 200. Following operation 310, the flow of the method 300 can move to operation 320.

Operation 320 includes categorizing data sequences based on sparsity patterns within a rolling window, where the system analyzes each data sequence to determine its sparsity characteristics such as percentage of missing values, regularity of observation intervals, and presence of burst patterns. The categorization process classifies each sequence into categories such as dense patterns for sequences having less than twenty percent missing values, sparse patterns for sequences having more than seventy percent missing values, and intermediate patterns for sequences having missing values between twenty and seventy percent. Following operation 320, the flow of the method 300 can move to operation 330. The system can categorize the data sequences in the same manner as described with reference to operation 206 of the method 200.

Operation 330 includes applying feature engineering techniques based on the determined sparsity classifications, where different encoding strategies are selected and implemented for each category of data sequences to optimize information extraction from the available temporal data points. Operation 330 includes operation 332 and operation 334. The system can select and encoding strategies for the different data sequences in the same manner as described with reference to operations 208 and 210 of the method 200.

Operation 332 applies feature engineering techniques to dense sequences that leverage abundant data availability through comprehensive statistical analysis. The techniques include computing moving averages across multiple temporal windows, calculating exponential moving averages with varying decay factors, determining volatility measures, extracting trend indicators, computing statistical moments such as skewness and kurtosis, and calculating correlation measures between different temporal segments. When sufficient dense data is available, machine learning encoding techniques such as autoencoder networks, recurrent neural network features, temporal convolutional networks, attention mechanisms, or embedding techniques are applied to extract complex temporal relationships and non-linear patterns.

Operation 334 applies feature engineering techniques to sparse sequences that maximize information extraction from limited available observations through time-aware and presence-based features. The techniques include extracting the most recent measurement value, calculating elapsed time since the most recent measurement, generating binary presence indicators for measurements within predefined time intervals, creating time-decay weighted features that apply exponential decay functions to historical measurements, and measuring gap duration statistics that characterize the temporal distribution of missing values within the rolling window period. Following operation 330, the flow of the method 300 can move to operation 340.

Operation 340 includes generating training datasets corresponding to different sparsity classifications, where the system partitions the processed feature vectors into separate datasets based on their sparsity pattern categories. The training datasets include a dense dataset containing feature vectors with statistical measures, trend indicators, and volatility calculations; a sparse dataset containing feature vectors with most recent values, time-elapsed calculations, and presence indicators; and an intermediate dataset containing feature vectors with hybrid features that adapt to local data density characteristics. Following operation 340, the flow of the method 300 can move to operation 350.

Operation 350 includes deploying machine learning models trained on the respective datasets, where the system makes individual models available for processing new time series data by automatically classifying incoming data sequences into their corresponding sparsity patterns and routing them to the appropriate specialized model for prediction or analysis tasks. The automatic classification and routing system adapts to changing data characteristics by re-evaluating sparsity patterns within rolling windows and updating model assignments as sequences transition between different sparsity classifications.

The method 300 provides an approach for adaptive sparse time series encoding that is executed by the user device instructions 108 stored in the user device memory set 106. The method 300 enables the user device 100 to perform comprehensive sparsity analysis and feature engineering operations locally while coordinating with other components of the system 10 for distributed processing of heterogeneous time series data. The method 300 processes time series data from diverse sources including financial market data where different securities exhibit heterogeneous trading frequencies, healthcare monitoring data where patient measurements occur at irregular intervals based on medical conditions and treatment schedules, and industrial sensor data where different monitoring devices report measurements based on connectivity availability and operational status. Each data sequence contains temporal data points that demonstrate different degrees of missing values, irregular sampling intervals, and heterogeneous data availability characteristics due to factors such as equipment failures, network connectivity issues, operational schedules, or event-driven measurement protocols. The categorization process implements a rolling window approach that examines each data sequence within a predetermined time window to calculate sparsity metrics including percentage of missing values, regularity of temporal intervals between data points by evaluating the consistency of temporal spacing between consecutive measurements, and presence of burst patterns characterized by clusters of measurements separated by extended gaps. These metrics enable automatic classification of sequences into appropriate sparsity pattern categories using predetermined thresholds and pattern recognition criteria.

Figure 4:
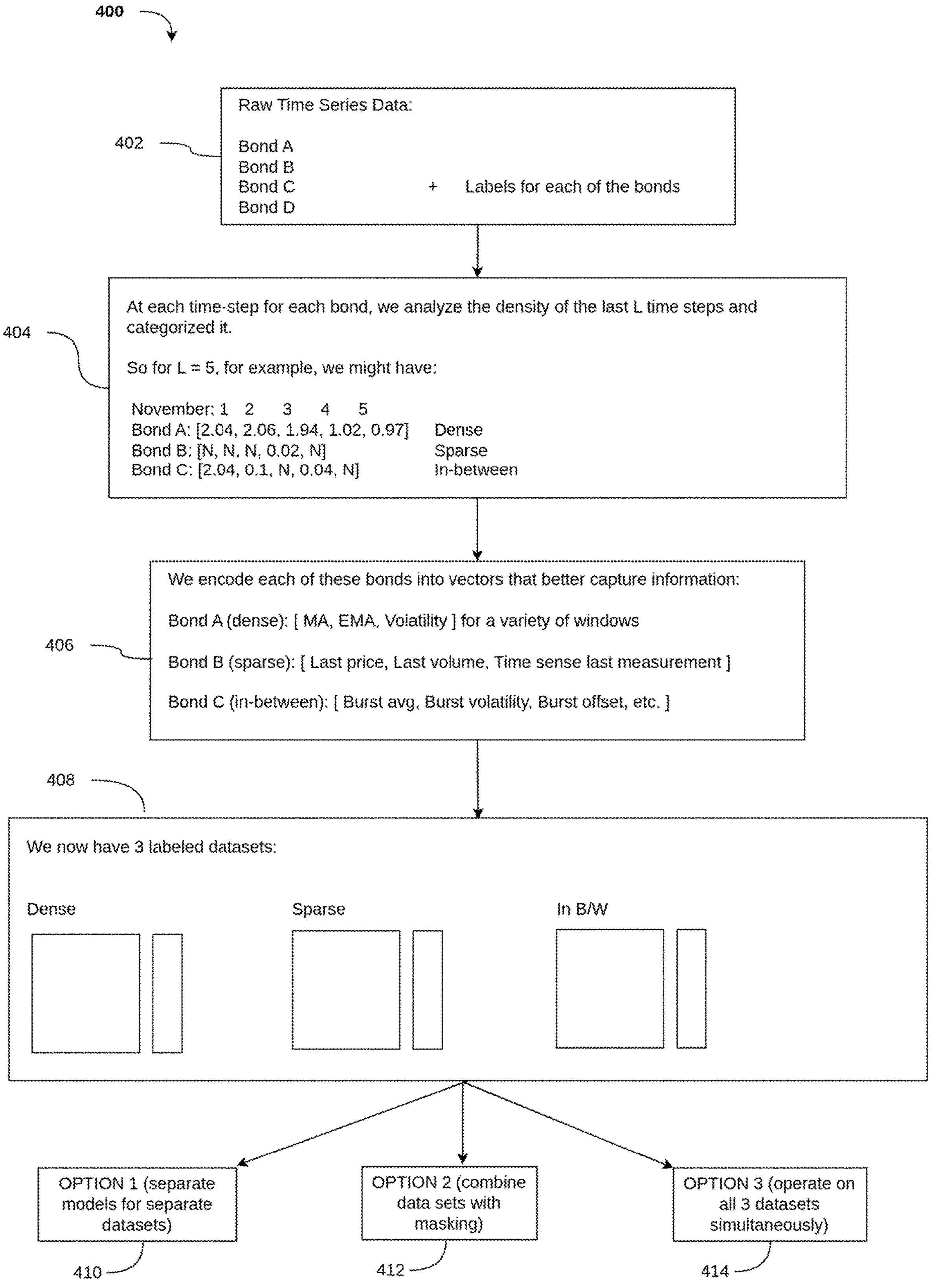
FIG. 4 illustrates an example method for adaptive sparse time series encoding, in accordance with some embodiments.

Referring to FIG. 4, a method 400 demonstrates the adaptive sparse time series encoding process using a bond pricing example that illustrates how the system processes heterogeneous financial data with varying sparsity characteristics. The method 400 can include any number of operations and the operations can be performed in any order. The method 400 can be performed by a data processing system, such as any of the computers described with reference to FIG. 1. The method 400 provides a concrete implementation of the adaptive encoding methodology applied to bond pricing data, where different bonds exhibit varying trading frequencies and data availability patterns that require specialized encoding strategies to extract meaningful information for predictive modeling applications.

The method 400 begins with an operation 402, which includes obtaining raw time series data comprising Bond A, Bond B, Bond C, and Bond D along with corresponding labels for each bond. The raw time series data represents bond pricing information collected from financial markets where different bonds demonstrate heterogeneous trading patterns and data availability characteristics. Bond A represents a frequently traded security with dense price observations, Bond B represents an infrequently traded security with sparse price data, Bond C represents a moderately traded security with intermediate data availability, and Bond D represents another bond with distinct sparsity characteristics. Each bond includes associated labels that provide ground truth information for supervised learning applications, such as future price movements, credit risk classifications, or other predictive targets relevant to bond pricing analysis. The raw time series data for each bond contains temporal price observations that exhibit varying degrees of missing values and irregular sampling intervals based on trading activity and market conditions.

Following operation 402, the method 400 proceeds to a operation 404, which includes analyzing the density of the last L time steps for each bond at each time step and categorizing the bonds accordingly, where L equals 5 in the illustrated example. The analysis implements a rolling window approach that examines the most recent five time periods for each bond to calculate sparsity metrics and determine appropriate classification categories. The rolling window analysis enables dynamic assessment of sparsity characteristics by evaluating data availability within the fixed-size temporal segment, allowing the system to adapt to changing trading patterns within individual bonds over time. The density analysis in step 404 for the November time period demonstrates the categorization process using specific bond price data examples. Bond A exhibits values [2.04, 2.06, 1.94, 1.02, 0.97] within the five-period rolling window, where all time periods contain valid price observations with no missing values, resulting in categorization as Dense. Bond B exhibits values [N, N, N, 0.02, N] within the five-period rolling window, where N represents missing or null values indicating periods without price observations due to lack of trading activity, resulting in categorization as Sparse with only one valid price observation out of five possible time periods. Bond C exhibits values [2.04, 0.1, N, 0.04, N] within the five-period rolling window, containing a mixture of valid price observations and missing values with three valid price observations out of five possible time periods, resulting in categorization as In-between. The categorization process applies quantitative thresholds to determine appropriate sparsity classifications based on the percentage of missing values within the rolling window. The Dense classification for Bond A corresponds to zero percent missing values, falling below the twenty percent threshold that separates dense patterns from intermediate patterns. The Sparse classification for Bond B corresponds to eighty percent missing values, exceeding the seventy percent threshold that separates intermediate patterns from sparse patterns. The In-between classification for Bond C corresponds to forty percent missing values, falling within the range between twenty and seventy percent that defines intermediate patterns.

Following operation 404, the method 400 moves to a operation 406, which includes encoding each bond into vectors that better capture information based on their respective categorization. The encoding process applies different feature engineering techniques to each bond based on its determined sparsity classification, ensuring that each bond receives encoding strategies optimized for its specific data availability characteristics. The adaptive encoding approach maximizes information extraction from the available temporal data points while avoiding techniques that would produce unreliable results due to insufficient data density. Bond A, categorized as Dense, receives encoding strategies that leverage abundant data availability through comprehensive statistical analysis. The encoding includes moving average calculations across multiple temporal windows to capture trend information at different time scales, exponential moving average calculations with varying decay parameters to emphasize recent observations while incorporating historical context, and volatility measurements that quantify the variability of price movements within the rolling window period. The moving average features include short-term averages spanning two to three time periods for capturing immediate price trends, medium-term averages spanning the entire five-period window for identifying intermediate patterns, and exponential moving averages with different decay factors to provide adaptive temporal weighting. The volatility features include standard deviation calculations, variance measurements, and range calculations that characterize the price fluctuation patterns within the dense data sequence.

Bond B, categorized as Sparse, receives encoding strategies that maximize information extraction from limited available observations. The encoding includes extracting the last price value as the most recent available measurement, extracting the last volume information if available to provide additional context about trading activity, and calculating time since last measurement to capture temporal staleness of the available price information. The last price feature provides the most current price estimate available from the sparse data sequence, while the time since last measurement feature quantifies how outdated this price information is based on the temporal gap since the last trading activity.

Bond C, categorized as In-between, receives encoding strategies that address the burst pattern characteristics exhibited by the intermediate sparsity classification. The encoding includes burst average calculations that compute statistical measures within individual burst periods, burst volatility measurements that quantify price variability within burst episodes, burst offset calculations that measure temporal positioning of burst periods, and other burst-related features that capture the clustering characteristics of the available price observations. The burst-based encoding approach recognizes that Bond C exhibits clustered price observations separated by missing value periods, requiring specialized techniques that analyze characteristics within individual burst periods rather than applying uniform statistical measures across the entire rolling window. The burst pattern encoding strategy includes computing statistical measures within individual burst periods by identifying clusters of consecutive price observations and calculating statistical summaries for each cluster, determining time gaps between consecutive burst periods to capture the temporal structure of missing data patterns, and calculating trend indicators within each burst period to capture directional price movements and momentum characteristics. The statistical measures within burst periods include average price calculations, volatility measurements, and trend indicators that capture directional price movements within each burst period. The time gap calculations measure the duration of missing value periods that separate individual burst episodes, providing information about the temporal distribution of data unavailability. Additional features include calculating the number of measurements within each burst period to quantify data density and determining the number of days between consecutive bursts to capture temporal spacing and frequency characteristics.

Following operation 406, the method 400 advances to an operation 408, which includes generating three labeled datasets corresponding to the different sparsity classifications identified during the categorization process. The Dense dataset contains feature vectors with moving average features, exponential moving average features, and volatility features extracted from bonds with abundant data availability. The Sparse dataset contains feature vectors with last price features, time since last measurement features, and presence indicator features extracted from bonds with limited data availability. The In-between dataset contains feature vectors with burst average features, burst volatility features, burst offset features, and inter-burst timing features extracted from bonds with intermediate sparsity and burst pattern characteristics.

Following operation 408, the method 400 branches into three options for downstream modeling approaches that handle the generated datasets. An operation 410 represents Option 1, which includes training separate models for separate datasets by developing individual machine learning models specialized for each sparsity classification. An operation 412 represents Option 2, which includes combining datasets with masking techniques that enable a single model to process feature vectors from multiple sparsity classifications while accounting for the different feature types through masking mechanisms. An operation 414 represents Option 3, which includes operating on all three datasets simultaneously using advanced modeling techniques such as attention-based models or multi-head architectures that process heterogeneous feature sets dynamically. The method 400 demonstrates how adaptive sparse time series encoding strategies are applied to real-world financial data where different securities exhibit varying trading patterns and data availability characteristics.

Figure 5:
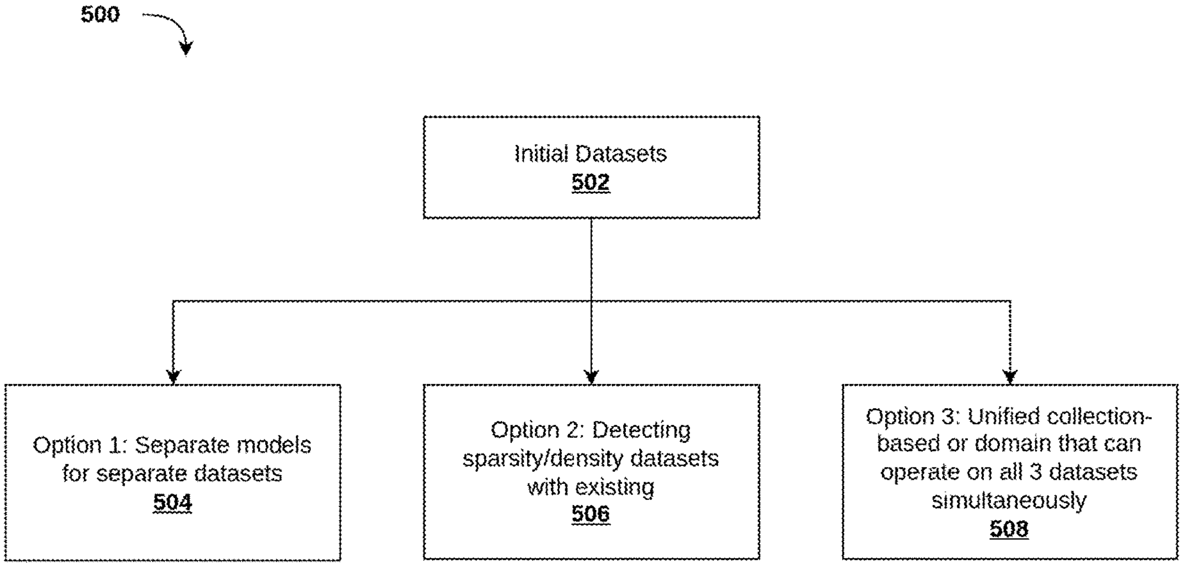
FIG. 5 illustrates an example method for handling multiple datasets with varying sparsity characteristics, in accordance with some embodiments.

Referring to FIG. 5, a method 500 demonstrates multiple dataset handling options for processing heterogeneous time series data with varying sparsity characteristics after adaptive encoding strategies have generated feature vectors for different sparsity pattern classifications. The method 500 can include any number of operations and the operations can be performed in any order. The method 500 can be performed by a data processing system, such as any of the computers described with reference to FIG. 1. The method 500 provides three distinct approaches for training machine learning models using the generated datasets, where each approach offers different advantages in terms of model specialization, computational efficiency, and weight sharing capabilities across heterogeneous feature sets. The method 500 begins with Initial Datasets 502, which represent starting datasets with varying sparsity characteristics that have been generated through the adaptive sparse time series encoding process. The Initial Datasets 502 contain feature vectors that have been partitioned based on sparsity pattern classification, where each dataset contains homogeneous feature vectors derived from data sequences with similar sparsity characteristics. The datasets include a dense dataset containing feature vectors with moving averages, exponential moving averages, and volatility measures extracted from sequences with abundant data availability, a sparse dataset containing feature vectors with most recent values, time-elapsed calculations, and presence indicators extracted from sequences with limited data availability, and an intermediate dataset containing feature vectors with burst-level statistics and gap duration measures extracted from sequences with moderate sparsity and clustering patterns.

From the Initial Datasets 502, the method 500 branches into three distinct processing pathways that represent different approaches for handling the multiple datasets in downstream machine learning applications. The first pathway leads to an Option 1: Separate models for separate datasets 504, which includes training individual models tailored to each dataset based on specific sparsity characteristics. This approach implements specialized machine learning algorithms for each sparsity pattern classification, where each model optimizes its parameters and learning procedures for the specific feature characteristics and information content associated with its respective dataset. The deployment process performs sparsity pattern analysis on new data sequences using the same rolling window approach and classification thresholds established during training, determines the appropriate sparsity classification for each new sequence, and directs the sequence to the corresponding specialized model for prediction or analysis tasks.

The second pathway leads to an Option 2: Detecting sparsity/density datasets with existing 506, which includes combining datasets using masking approaches where boosting models handle missing values and enable weight sharing benefits across different sparsity pattern types. The masking approach combines all datasets together using masking techniques where boosting models handle missing values through built-in missing value handling capabilities. The combination process concatenates feature vectors from different sparsity classifications into unified feature matrices where each row contains features from all encoding strategies, but individual data sequences only have valid values for features corresponding to their sparsity classification while other features are marked as missing or masked. Tree-based boosting models such as XGBoost, LightGBM, or CatBoost process these unified feature matrices by automatically handling missing values through their internal splitting algorithms. The weight sharing benefits enable the boosting model to learn relationships and patterns that span across different sparsity pattern types while maintaining the adaptive encoding advantages achieved through sparsity-specific feature engineering.

The third pathway leads to an Option 3: Unified collection-based or domain that can operate on all 3 datasets simultaneously 508, which includes advanced modeling approaches that process all three datasets simultaneously using sophisticated architectures designed for heterogeneous data processing. This option implements attention-based models that handle different feature sets dynamically and provide weight sharing capabilities across heterogeneous features using neural network architectures with attention mechanisms that selectively focus on relevant features within heterogeneous feature sets. The attention-based models implement multi-head attention architectures that simultaneously process dense features such as moving averages and volatility measures, sparse features such as time-elapsed calculations and presence indicators, and intermediate features such as burst statistics and gap duration measures. Alternatively, this option implements encoder models that encode data from separate datasets into a single unified dataset before training a model on the combined data, using neural network architectures such as autoencoders, variational autoencoders, or transformer encoders to learn compressed representations of feature vectors from each sparsity classification. The method 500 enables flexible deployment strategies where the choice between the three options is made based on specific application requirements, computational constraints, and performance objectives. The separate models approach provides maximum specialization and interpretability, the masking approach provides computational efficiency with moderate weight sharing benefits, and the unified approach provides sophisticated cross-pattern learning capabilities with advanced architectural requirements.

The system 10 includes operational capabilities for processing new time series data for prediction after deployment of the trained machine learning models. The server memory set 156 stores additional instructions that enable real-time prediction operations on incoming time series data with varying sparsity characteristics. When executed by the server processor set 152, these instructions cause the system to receive new time series data for prediction, classify the new time series data into one of the plurality of sparsity pattern classifications, and apply a corresponding machine learning model based on the classification to generate predictions. The prediction operations begin when the system 10 receives new time series data through the network 190 from various data sources such as financial market feeds, sensor networks, healthcare monitoring systems, or other temporal data collection systems. The server processor set 152 executes the stored instructions to perform sparsity pattern analysis on the new time series data using the same rolling window approach and classification criteria established during the training phase. The classification process analyzes each new data sequence within a predetermined time window to calculate sparsity metrics such as percentage of missing values, regularity of observation intervals, and identification of burst patterns, enabling automatic categorization of each new data sequence into one of the established sparsity pattern classifications. Following classification of the new time series data, the system 10 applies a corresponding machine learning model based on the determined sparsity pattern classification to generate predictions. The application includes selecting the machine learning model trained on the training dataset corresponding to the determined sparsity pattern classification and processing feature vectors generated from the new time series data using feature engineering techniques corresponding to the determined sparsity pattern classification. The server processor set 152 applies the same adaptive encoding strategies used during training to generate feature vectors from the new time series data based on the determined sparsity classification, maintaining consistency with the encoding strategies applied during training to ensure compatibility between the new feature vectors and the trained model parameters. The system 10 enables continuous processing of streaming time series data where sparsity patterns change over time or vary across different data sources. The adaptive classification and model selection system responds to changing data characteristics by re-evaluating sparsity patterns within rolling windows and updating model assignments as sequences transition between different sparsity classifications. The prediction operations are distributed across multiple components of the system 10 to enable scalable processing of large volumes of incoming time series data, with the user device 100 performing initial data preprocessing and sparsity classification operations, while the server 150 handles model application and prediction generation. The system maintains prediction accuracy by ensuring that the feature engineering techniques applied to new time series data match the encoding strategies used during training for each sparsity pattern classification (e.g., sparse+regular, burst pattern, systematic gaps, others, or combinations thereof). The system 10 can provide these explicit sparsity pattern labels as output to a user or calling program so they can better understand their data and why certain features were generated. A system having the capability of classifying the sparsity pattern and providing it as output to a user is improved relative to one that does not have such a capability is improved at least by providing greater insights into data characteristics, which improves debugging.

In some aspects, a set of one or more non-transitory computer-readable media stores instructions that, when executed by one or more processors, cause the processors to obtain time series data comprising multiple data sequences, each containing temporal data points with varying sparsity patterns. The instructions further cause the processors to analyze the sparsity characteristics of each data sequence within a rolling window to determine a sparsity pattern classification. Based on the determined classification, an encoding strategy is selected for each data sequence, with different strategies applied to sequences having different sparsity classifications. Feature vectors are generated for each data sequence using the appropriate encoding strategy, and a machine learning model is trained using the generated feature vectors.

In some embodiments, analyzing sparsity characteristics includes calculating a percentage of missing values within the rolling window, measuring the regularity of observation intervals, and identifying burst patterns in the temporal data points. In some embodiments, the sparsity pattern classification includes a dense pattern for data sequences having less than twenty percent missing values, a sparse pattern for sequences having more than seventy percent missing values, and an in-between pattern for sequences having a percentage of missing values between twenty and seventy percent. In some embodiments, the encoding strategy for sequences classified as dense includes calculating moving averages across multiple time windows, computing exponential moving averages with varying decay factors, and determining volatility measures for the temporal data points.

In some embodiments, the encoding strategy for sequences classified as sparse includes extracting the most recent measurement value, calculating the time elapsed since that measurement, and generating binary indicators representing the presence of measurements within predefined time periods. In some embodiments, the encoding strategy for sequences exhibiting burst patterns includes computing statistical measures within individual burst periods, determining time gaps between consecutive bursts, and calculating trend indicators for each burst period. In some embodiments, training the machine learning model includes partitioning the generated feature vectors into separate datasets based on the sparsity classification, training individual models for each classification, and deploying the respective models for prediction based on the classification of new incoming data sequences.

In an aspect, a system is provided comprising one or more processors and a memory storing instructions which, when executed by the processors, cause the system to obtain time series data comprising multiple data sequences with different degrees of sparsity. The system categorizes each data sequence into one of multiple sparsity classifications based on the analysis of data availability within a predetermined time window, applies feature engineering techniques suited to the classification—where dense sequences receive a first set of techniques and sparse sequences a second, distinct set—then generates training datasets for each classification and deploys separate machine learning models trained on those datasets.

In some embodiments, categorizing the data sequences includes calculating the percentage of missing values within the predetermined time window, determining the regularity of temporal intervals between data points, and detecting burst patterns comprised of measurement clusters separated by extended gaps. In some embodiments, the sparsity pattern classifications in the system include a dense classification for sequences with less than twenty percent missing values, a sparse classification for sequences with more than seventy percent missing values, and an intermediate classification for sequences having missing values between twenty and seventy percent.

In some embodiments, the first set of feature engineering techniques for dense sequences includes computing moving averages over multiple temporal windows, calculating exponential moving averages with different decay parameters, and determining volatility measures for the data points. In some embodiments, the second set of feature engineering techniques for sparse sequences includes extracting the most recent available measurement, calculating the elapsed time since the most recent measurement, and generating binary presence indicators for measurements occurring within specified time intervals. In some embodiments, further instructions stored in the memory enable the system to receive new time series data for prediction, classify such data into one of the sparsity pattern classifications, and apply a corresponding machine learning model based on the classification to generate predictions. In some embodiments, applying the corresponding model includes selecting the model trained on the dataset associated with the sparsity classification of the new time series data, and processing feature vectors generated from the new data using feature engineering techniques appropriate for that classification.

In an aspect, a method is provided in which time series data having irregular sampling patterns and missing values across multiple sequences is received. Sparsity pattern analysis is performed on each data sequence using a rolling window to classify each sequence as dense, sparse, or intermediate based on data availability metrics. Adaptive encoding strategies are selected for each data sequence according to its classification, with different feature extraction techniques optimized for the respective patterns, and feature matrices are generated using those strategies. Predictive models are trained using the resulting feature matrices, enabling predictions on heterogeneous time series data with varying sparsity.

In some embodiments, performing sparsity analysis in the method includes calculating the percentage of missing values within the rolling window, measuring the regularity of temporal intervals between consecutive data points, and identifying burst patterns characterized by clusters of measurements separated by extended time gaps. In some embodiments, the data availability metrics for classification include dense sequences with less than twenty percent missing values, sparse sequences with more than seventy percent missing values, and intermediate sequences with missing values between twenty and seventy percent.

In some embodiments, adaptive encoding strategies for dense data sequences include computing moving averages across multiple temporal windows, calculating exponential moving averages with varying decay parameters, and determining volatility measures for the temporal data points. In some embodiments, adaptive encoding strategies for sparse data sequences include extracting the most recent measurement value, calculating elapsed time since that measurement, and generating binary presence indicators for measurements occurring within predefined time intervals. In some embodiments, training predictive models in the method includes partitioning the generated feature matrices into separate training datasets according to the sparsity classification, training individual machine learning models for each classification, and deploying the respective models to make predictions on new time series data based on their classification.

Computing Environment

Figure 6:
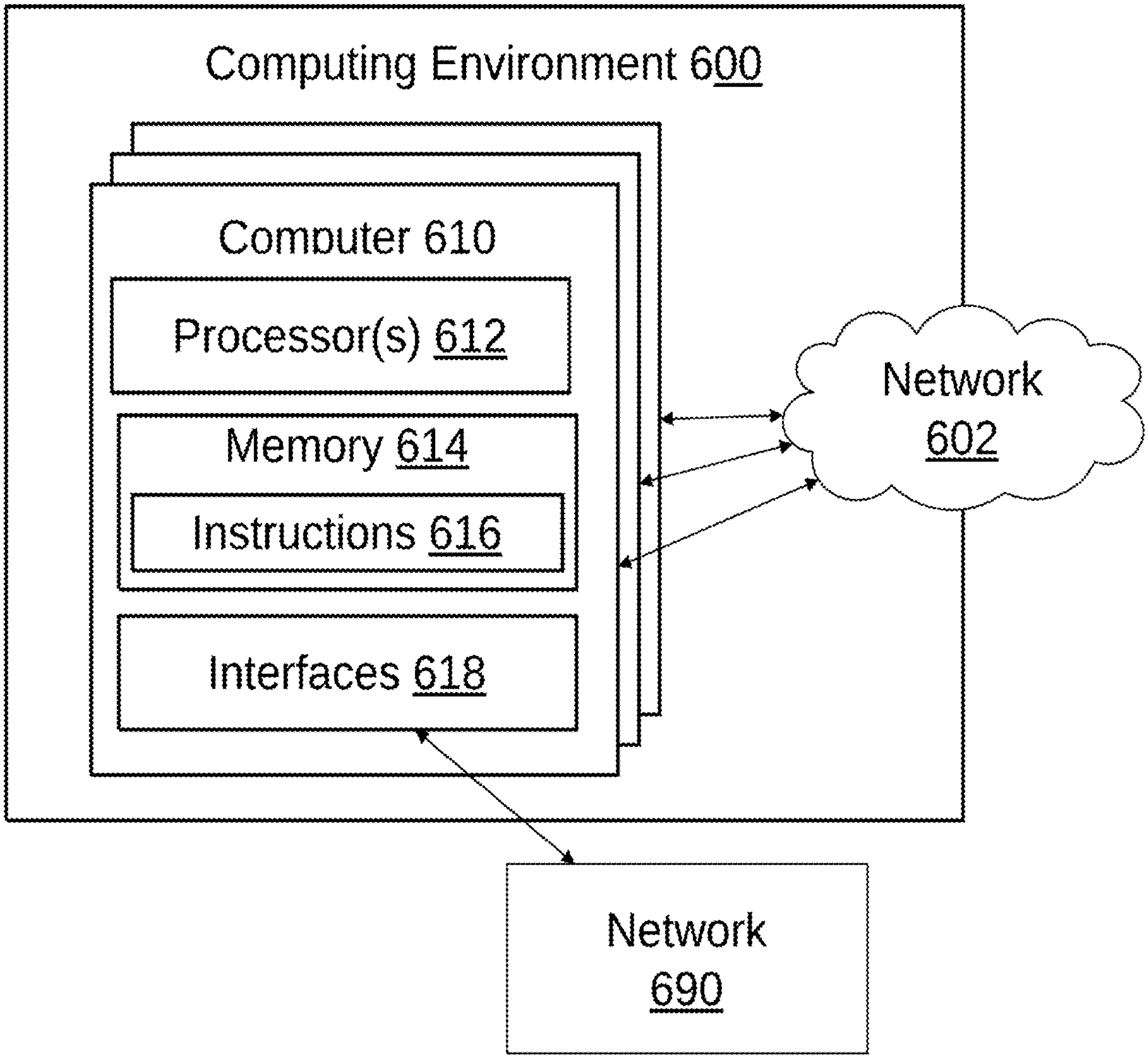
FIG. 6 discloses a computing environment with which aspects of the present disclosure may be implemented, in accordance with some embodiments.

FIG. 6 discloses a computing environment 600 in which aspects of the present disclosure may be implemented. A computing environment 600 is a set of one or more virtual or physical computers 610 that individually or in cooperation achieve tasks, such as implementing one or more aspects described herein. The computers 610 have components that cooperate to cause output based on input. Example computers 610 include desktops, servers, mobile devices (e.g., smart phones and laptops), wearables, virtual reality devices, augmented reality devices, expanded reality devices, spatial computing devices, virtualized devices, other computers, or combinations thereof. In particular example implementations, the computing environment 600 includes at least one physical computer.

The computing environment 600 may specifically be used to implement one or more aspects described herein. In some examples, one or more of the computers 610 may be implemented as a user device, such as mobile device and others of the computers 610 may be used to implement aspects of a machine learning framework useable to train and deploy models exposed to the mobile device or provide other functionality, such as through exposed application programming interfaces.

The computing environment 600 can be arranged in any of a variety of ways. The computers 610 can be local to or remote from other computers 610 of the environment 600. The computing environment 600 can include computers 610 arranged according to client-server models, peer-to-peer models, edge computing models, other models, or combinations thereof.

In many examples, the computers 610 are communicatively coupled with devices internal or external to the computing environment 600 via a network 602. The network 602 is a set of devices that facilitate communication from a sender to a destination, such as by implementing communication protocols. Example networks 602 include local area networks, wide area networks, intranets, or the Internet.

In some implementations, computers 610 can be general-purpose computing devices (e.g., consumer computing devices). In some instances, via hardware or software configuration, computers 610 can be special purpose computing devices, such as servers able to practically handle large amounts of client traffic, machine learning devices able to practically train machine learning models, data stores able to practically store and respond to requests for large amounts of data, other special purposes computers, or combinations thereof. The relative differences in capabilities of different kinds of computing devices can result in certain devices specializing in certain tasks. For instance, a machine learning model may be trained on a powerful computing device and then stored on a relatively lower powered device for use. Such relatively low powered device may nonetheless be specially configured for such inference tasks so that it performs inference faster or more efficiently than a standard desktop or laptop computer. Many example computers 610 include a processor set 612, a memory set 614, and an interface set 618. Such components can be virtual, physical, or combinations thereof.

The processor set 612 is a set of one or more processors. Processors are components that execute instructions, such as instructions that obtain data, process the data, and provide output based on the processing. The processor set 612 often (collectively or individually) obtain instructions and data stored by the memory set 614. The processors of the processor set 612 can take any of a variety of forms, such as central processing units, graphics processing units, coprocessors, tensor processing units, artificial intelligence accelerators, microcontrollers, microprocessors, application-specific integrated circuits, field programmable gate arrays, other processors, or combinations thereof. In example implementations, the processor set 612 includes at least one physical processor implemented as an electrical circuit. Example providers or designers of processors 612 include INTEL, AMD, QUALCOMM, TEXAS INSTRUMENTS, and APPLE.

The memory set 614 is a collection of components configured to store instructions 616 and data for later retrieval and use. The instructions 616 can, when executed by one or more processors of processor set 612, cause execution of one or more operations that implement aspects described herein. In many examples, the memory 614 is a non-transitory computer readable medium, such as random-access memory, read only memory, cache memory, registers, portable memory (e.g., enclosed drives or optical disks), mass storage devices, hard drives, solid state drives, other kinds of memory, or combinations thereof. In certain circumstances, the memory set 614 can include transitory memory that stores information encoded in transient signals.

The interface set 618 is a set of one or more components that facilitate receiving input from and providing output to something external to the computer 610, such as visual output components (e.g., displays or lights), audio output components (e.g., speakers), haptic output components (e.g., vibratory components), visual input components (e.g., cameras), auditory input components (e.g., microphones), haptic input components (e.g., touch or vibration sensitive components), motion input components (e.g., mice, gesture controllers, finger trackers, eye trackers, or movement sensors), buttons (e.g., keyboards or mouse buttons), position sensors (e.g., terrestrial or satellite-based position sensors such as those using the Global Positioning System), other input components, or combinations thereof (e.g., a touch sensitive display). The interfaces set 618 can include one or more components for sending or receiving data from other computing environments or electronic devices, such as one or more wired connections (e.g., Universal Serial Bus connections, THUNDERBOLT connections, ETHERNET connections, serial ports, or parallel ports) or wireless connections (e.g., via components configured to communicate via radiofrequency signals, such as according to WI-FI, cellular, BLUETOOTH, ZIGBEE, or other protocols). One or more of the one or more interfaces 618 can facilitate connection of the computing environment 600 to a network 690.

The computers 610 can include any of a variety of other components to facilitate performance of operations described herein. Example components include one or more power units (e.g., batteries, capacitors, power harvesters, or power supplies) that provide operational power, one or more busses to provide intra-device communication, one or more cases or housings to encase one or more components, other components, or combinations thereof.

A person of skill in the art, having benefit of this disclosure, may recognize various ways for implementing technology described herein, such as by using any of a variety of programming languages (e.g., a C-family programming language, PYTHON, JAVA, RUST, HASKELL, other languages, or combinations thereof), libraries or packages (e.g., that provide functions for obtaining, processing, and presenting data, such as may be obtained using a package manager like PIP or CONDA), compilers, and interpreters to implement aspects described herein. Example libraries include NLTK (Natural Language Toolkit) by Team NLTK (providing natural language functionality), PYTORCH by META (providing machine learning functionality), NUMPY by the NUMPY Developers (providing mathematical functions), and BOOST by the Boost Community (providing various data structures and functions) among others. Operating systems (e.g., WINDOWS, LINUX, MACOS, IOS, and ANDROID) may provide their own libraries or application programming interfaces useful for implementing aspects described herein, including user interfaces and interacting with hardware or software components. Web applications can also be used, such as those implemented using JAVASCRIPT or another language. A person of skill in the art, with the benefit of the disclosure herein, can use programming tools to assist in the creation of software or hardware to achieve techniques described herein, such as intelligent code completion tools (e.g., INTELLISENSE) and artificial intelligence tools (e.g., GITHUB COPILOT by MICROSOFT or CODE LLAMA by META).

In some examples, large language models can be used to understand natural language, generate natural language, or perform other tasks. Examples of such large language models include CHATGPT or other flagship models (GPT-4o, o1, o3, or others as released) by OPENAI, a LLAMA model by META, a CLAUDE model by ANTHROPIC, a GEMINI model by GOOGLE, others, or combinations thereof. Such models can be fine-tuned on relevant data using any of a variety of techniques to improve the accuracy and usefulness of the answers. The models can be run locally on server or client devices or accessed via an application programming interface. Some of those models or services provided by entities responsible for the models may include other features, such as speech-to-text features, text-to-speech, image analysis, research features, and other features, which may also be used as applicable.

Referring to FIG. 6, a computing environment 600 provides a foundational architecture for implementing adaptive sparse time series encoding operations across networked computing systems. The computing environment 600 demonstrates how the adaptive encoding methodology is deployed within distributed computing infrastructures that support real-time processing of heterogeneous time series data with varying sparsity characteristics. The computing environment 600 enables scalable implementation of the sparsity pattern analysis, adaptive feature engineering, and specialized model training procedures described in the previous methods and systems. The computing environment 600 includes a network 602 that provides communication pathways for data exchange between distributed computing resources and external data sources. The network 602 facilitates transmission of time series data from various sources such as financial market feeds, sensor networks, healthcare monitoring systems, or other temporal data collection systems to computing resources within the computing environment 600. The network 602 implements various communication protocols and network topologies to support high-volume data transmission and real-time processing requirements associated with adaptive sparse time series encoding applications.

The computing environment 600 includes a computer 610 connected to the network 602 that serves as a primary processing resource for implementing adaptive sparse time series encoding operations. The computer 610 provides computational capabilities for performing sparsity pattern analysis, adaptive feature engineering, and machine learning model training and deployment operations described in the previous methods. The computer 610 represents various computing platforms including server systems, workstations, cloud computing instances, or distributed computing clusters depending on the specific deployment requirements and computational demands of the adaptive encoding applications. The computer 610 includes a processor set 612 comprising one or more processors that execute instructions to perform adaptive sparse time series encoding operations. The processor set 612 provides computational resources for implementing the rolling window analysis algorithms that calculate sparsity metrics such as percentage of missing values, regularity of observation intervals, and identification of burst patterns within time series data sequences. The processor set 612 executes classification algorithms that categorize data sequences into sparsity pattern types such as dense, sparse, or intermediate patterns based on predetermined thresholds and pattern recognition criteria. The processor set 612 implements adaptive encoding strategies that select appropriate feature engineering techniques for each sparsity pattern classification, executing feature engineering algorithms that generate moving averages, exponential moving averages, and volatility measures for dense sequences while applying specialized encoding techniques that extract most recent measurement values, calculate time-elapsed since last observation, and generate binary presence indicators for sparse sequences.

The computer 610 includes a memory 614 that stores both instructions 616 and data used during adaptive sparse time series encoding operations. The memory 614 provides storage capacity for maintaining the algorithms, parameters, and intermediate results associated with sparsity pattern analysis, feature engineering, and machine learning model training procedures. The memory 614 stores raw time series data received from external sources through the network 602, sparsity classification results, feature engineering parameters, and trained model parameters and configurations for deployment in prediction applications. The instructions 616 stored in the memory 614, when executed by the processor set 612, cause the processor set 612 to perform the adaptive sparse time series encoding operations described in the previous methods and systems. The instructions 616 contain executable code that implements the rolling window analysis algorithms for calculating sparsity metrics and classifying data sequences, feature engineering algorithms that apply different encoding strategies to each sparsity pattern classification, data acquisition procedures that receive temporal data from various sources, and model training algorithms that optimize predictive performance for heterogeneous time series data.

The computer 610 includes an interface set 618 that facilitates communication between the computer 610 and external components including the network 602. The interface set 618 enables the computer 610 to receive time series data from various external sources through the network 602 and transmit processing results back to requesting systems or applications. The interface set 618 supports various communication protocols and data formats to enable integration with diverse data sources and downstream applications that require adaptive sparse time series encoding capabilities. The interface set 618 facilitates real-time processing capabilities by enabling continuous data exchange between the computer 610 and external systems through the network 602, supporting streaming data protocols that enable the computer 610 to process time series data as it becomes available from external sources. The computing environment 600 supports distributed processing architectures where multiple computer 610 instances collaborate to handle large volumes of heterogeneous time series data with varying sparsity characteristics. The network 602 enables coordination between multiple computing resources that specialize in different aspects of the adaptive encoding workflow, such as sparsity analysis, feature engineering, or model training operations. The distributed architecture capabilities of the computing environment 600 enable scalable deployment of adaptive sparse time series encoding systems that handle high-volume data streams and complex analytical requirements across various application domains including financial market analysis, healthcare monitoring, industrial sensor networks, and scientific observation systems.

Machine Learning Framework

Figure 7:
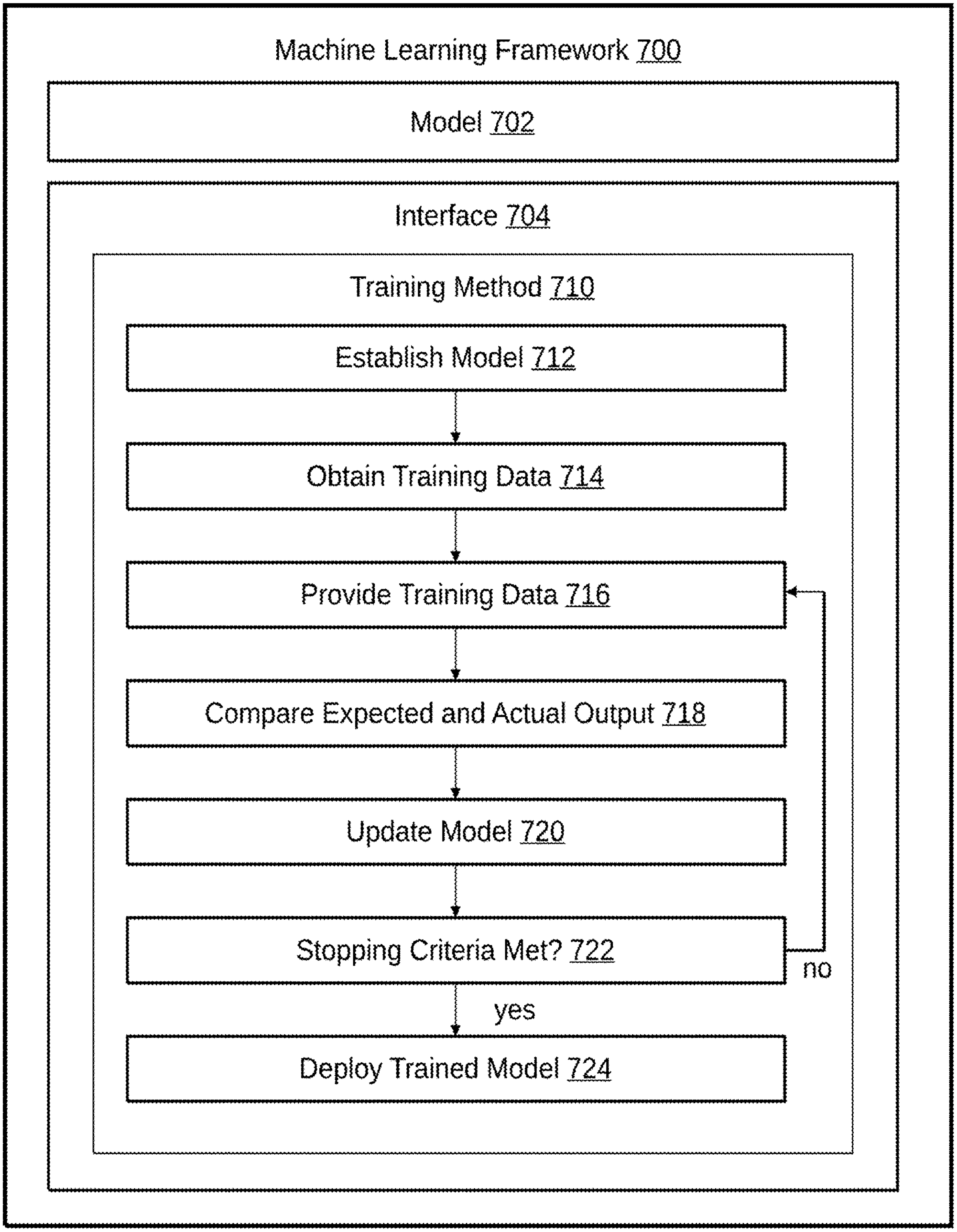
FIG. 7 illustrates an example machine learning framework, in accordance with some embodiments.

FIG. 7 illustrates an example machine learning framework 700 that techniques described herein may benefit from or improve on. A machine learning framework 700 is a collection of software and data that implements artificial intelligence trained to provide output, such as predictive data, based on input. Examples of artificial intelligence that can be implemented with machine learning way include neural networks (including recurrent neural networks), language models (including so-called "large language models"), generative models, natural language processing models, adversarial networks, decision trees, Markov models, support vector machines, genetic algorithms, others, or combinations thereof. A person of skill in the art having the benefit of this disclosure will understand that these artificial intelligence implementations need not be equivalent to each other and may instead select from among them based on the context in which they will be used. Machine learning frameworks 700 or components thereof are often built or refined from existing frameworks, such as TENSORFLOW by GOOGLE, INC. or PYTORCH by the PYTORCH community.

The machine learning framework 700 includes one or more models 702 that are the structured representation of learning and an interface 704 that supports use of the model 702. The model 702 can take any of a variety of forms, including representations of nodes (e.g., neural network nodes, decision tree nodes, Markov model nodes, other nodes, or combinations thereof) and connections between nodes (e.g., weighted or unweighted unidirectional or bidirectional connections). In certain implementations, the model 702 can include a representation of memory (e.g., providing long short-term memory functionality). Where the set includes more than one model 702, the models 702 can be linked, cooperate, or compete to provide output.

The interface 704 includes software procedures (e.g., defined in a library) that facilitate the use of the model 702, such as by providing a way to establish and interact with the model 702. For instance, the software procedures can include software for receiving input, preparing input for use (e.g., by performing vector embedding, such as using Word2Vec, BERT, or another technique), processing the input with the model 702, providing output, training the model 702, performing inference with the model 702, fine tuning the model 702, other procedures, or combinations thereof.

The interface 704 facilitates a training method 710 that includes operation 712 for establishing a model 702, such as initializing a model 702 with values and setting up the model 702 for further use. In examples, the model 702 can be pretrained. Operation 714 follows operation 712 and includes obtaining training data, which in many examples includes pairs of input and desired output given the input. In supervised or semi-supervised training, the data can be prelabeled, such as by human or automated labelers, while in unsupervised learning the training data can be unlabeled. The training data can include validation data used to validate the trained model 702.

Operation 716 follows operation 714 and includes providing a portion of the training data to the model 702 in a format usable by the model 702. The framework 700 (e.g., via the interface 704) can cause the model 702 to produce an output based on the input. Operation 718 follows operation 716 and includes comparing the expected output with the actual output, such as by applying a loss function to determine the difference between expected and actual. This value can be used to determine how training is progressing. Operation 720 follows operation 718 and includes updating the model 702 based on the result of the comparison. This can take any of a variety of forms depending on the nature of the model 702. Where the model 702 includes weights, the weights can be modified to increase the likelihood that the model 702 will produce correct output given an input. Depending on the model 702, backpropagation or other techniques can be used to update the model 702. Operation 722 follows operation 720 and includes determining whether a stopping criterion has been reached, such as based on the output of the loss function (e.g., actual value or change in value over time), a number of training epochs that have occurred, or an amount of training data that has been used. If the stopping criterion has not been satisfied, the flow of the method can return to operation 714. If the stopping criterion has been satisfied, the flow can move to operation 722, which includes deploying the trained model 702 for use in production, such as providing the trained model 702 with real-world input data and produce output data used in a real-world process. The model 702 can be stored in memory 614 of at least one computer 610, or distributed across memories of two or more such computers 610 for production of output data (e.g., predictive data).

Referring to FIG. 7, the machine learning framework 700 provides a comprehensive training and deployment system for implementing adaptive sparse time series encoding models within the system 10 architecture. The framework 700 enables systematic development of specialized models that process feature vectors generated through the adaptive encoding strategies described in the previous methods, where different sparsity pattern classifications require optimized model training approaches to achieve effective predictive performance on heterogeneous time series data. The models 702 represent machine learning algorithms and parameter configurations specialized for processing feature vectors derived from time series data with varying sparsity characteristics. These include individual models optimized for processing dense feature vectors containing moving averages and volatility measures, models optimized for processing sparse feature vectors containing most recent values and time-elapsed calculations, and models optimized for processing intermediate feature vectors containing burst statistics and gap duration measures. The models 702 enable specialized processing capabilities for each sparsity pattern type while maintaining compatibility with the adaptive encoding methodology. The interface 704 facilitates interaction between the models 702 and external components of the system 10 throughout training and deployment processes. The interface 704 enables communication with data sources that provide training datasets generated through the adaptive sparse time series encoding methodology and facilitates real-time processing of incoming data sequences with varying sparsity characteristics. The interface 704 provides standardized communication protocols that enable the models 702 to integrate with the distributed processing architecture of the system 10, handling data format conversions and protocol translations for seamless integration between adaptive encoding components and machine learning training procedures.

The training method 710 provides systematic procedures for developing specialized models capable of processing feature vectors derived from heterogeneous sparsity characteristics. The method 710 enables iterative optimization of model parameters through supervised learning approaches that leverage labeled training datasets generated through the adaptive sparse time series encoding methodology, supporting various machine learning algorithms including gradient boosting machines, random forests, neural networks, and linear regression models depending on the specific requirements of each sparsity pattern classification. Operation 712 establishes models by initializing machine learning algorithm architectures and parameter configurations appropriate for processing feature vectors from specific sparsity pattern classifications. The model establishment process selects appropriate algorithmic approaches based on feature vector characteristics, where dense feature vectors benefit from algorithms capable of processing complex statistical relationships while sparse feature vectors require algorithms optimized for handling limited information content. Dense pattern models utilize complex algorithms such as deep neural networks or ensemble methods that capture sophisticated statistical relationships, while sparse pattern models implement algorithms such as linear regression or simple tree-based methods that effectively process limited information content. Intermediate pattern models utilize hybrid approaches that handle burst-level statistics and gap duration features characteristic of moderate sparsity patterns.

Operation 714 obtains training data comprising pairs of input feature vectors and desired output labels for supervised learning applications. The training data includes feature vectors generated through adaptive sparse time series encoding strategies along with corresponding ground truth labels that provide target values for predictive modeling tasks. Dense pattern training data includes feature vectors containing moving averages, exponential moving averages, and volatility measures paired with corresponding labels, while sparse pattern training data includes feature vectors containing most recent values, time-elapsed calculations, and presence indicators paired with corresponding labels. Intermediate pattern training data includes feature vectors containing burst statistics and gap duration measures paired with corresponding labels that enable effective processing of moderate sparsity characteristics. Operation 716 provides portions of training data to the models 702 in formats usable by the machine learning algorithms. The data provision process selects subsets of training data pairs and formats feature vectors and labels according to input requirements of specific machine learning algorithms. The formatting process ensures feature vectors are presented in appropriate data structures, numerical formats, and dimensional arrangements while maintaining information content derived through adaptive encoding strategies. The process implements batch processing approaches and random sampling strategies that ensure representative coverage of the training dataset while avoiding overfitting.

Operation 718 compares expected output with actual output using loss functions to determine differences between predicted results and target labels. The comparison process evaluates model performance by measuring discrepancies between predictions generated by current model parameters and desired output labels provided in training data pairs. Loss function implementations utilize various mathematical formulations depending on specific prediction tasks, with regression tasks implementing functions such as mean squared error or mean absolute error, while classification tasks implement functions such as cross-entropy or hinge loss. The quantitative performance measures provide objective criteria for evaluating model training progress and determining when satisfactory performance levels have been achieved. Operation 720 updates the models 702 based on comparison results by modifying weights and other parameters to increase the likelihood of correct output in future predictions. The model update process implements optimization algorithms such as gradient descent, Adam optimization, or other parameter update strategies that adjust model parameters based on loss function gradients calculated in operation 718. The parameter updates enable each model to specialize in processing its respective feature vector types while maintaining compatibility with the adaptive encoding methodology.

Operation 722 determines whether stopping criteria have been reached based on loss function output, number of training epochs, or amount of training data used. The stopping criteria evaluation assesses whether model training has achieved satisfactory performance levels or whether additional training iterations are required. The evaluation considers loss function convergence by monitoring improvement rates in predictive performance, epoch-based criteria that establish predetermined limits on training duration, and data utilization criteria that monitor the proportion of training data processed. The training method 710 implements an iterative process where the flow returns to operation 714 if stopping criteria are not satisfied, enabling continued training iterations until satisfactory performance levels are achieved. When stopping criteria are satisfied, the method proceeds to deployment operations that make trained models 702 available for processing new time series data with varying sparsity characteristics. The deployment process enables real-time application of trained models 702 to incoming data sequences that have been classified and encoded using the same adaptive sparse time series encoding methodology applied during training. The deployment operations integrate trained models 702 with the system 10 architecture to enable continuous processing of heterogeneous time series data through specialized models optimized for each sparsity pattern classification. The machine learning framework 700 provides predictive capabilities for various application domains including financial market analysis, healthcare monitoring, industrial sensor networks, and scientific observation systems, enabling practical implementation of adaptive sparse time series encoding technology in real-world applications that require effective processing of heterogeneous temporal data with varying sparsity characteristics.

Application of Techniques

Techniques herein may be applicable to improving technological processes of a financial institution, such as technological aspects of transactions (e.g., resisting fraud, entering loan agreements, transferring financial instruments, or facilitating payments). Although technology may be related to processes performed by a financial institution, unless otherwise explicitly stated, claimed inventions are not directed to fundamental economic principles, fundamental economic practices, commercial interactions, legal interactions, or other patent ineligible subject matter without something significantly more.

Where implementations involve personal or corporate data, that data can be stored in a manner consistent with relevant laws and with a defined privacy policy. In certain circumstances, the data can be decentralized, anonymized, or fuzzed to reduce the amount of accurate private data that is stored or accessible at a particular computer. The data can be stored in accordance with a classification system that reflects the level of sensitivity of the data and that encourages human or computer handlers to treat the data with a commensurate level of care.

Where implementations involve machine learning, machine learning can be used according to a defined machine learning policy. The policy can encourage training of a machine learning model with a diverse set of training data. Further, the policy can encourage testing for and correcting undesirable bias embodied in the machine learning model. The machine learning model can further be aligned such that the machine learning model tends to produce output consistent with a predetermined morality. Where machine learning models are used in relation to a process that makes decisions affecting individuals, the machine learning model can be configured to be explainable such that the reasons behind the decision can be known or determinable. The machine learning model can be trained or configured to avoid making decisions based on protected characteristics.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A set of one or more non-transitory computer readable media having instructions that, when executed by a processor set, cause the processor set to:

obtain time series data comprising a plurality of data sequences, each data sequence having temporal data points with varying sparsity patterns;

analyze sparsity characteristics of each data sequence within a rolling window to determine a sparsity pattern classification;

select an encoding strategy for each data sequence based on the determined sparsity pattern classification, wherein different encoding strategies are applied to data sequences having different sparsity pattern classifications;

generate feature vectors for each data sequence using the selected encoding strategy, wherein feature vectors generated for data sequences classified as having a dense sparsity pattern comprise moving averages and volatility measures, and feature vectors generated for data sequences classified as having a sparse sparsity pattern comprise most recent measurement values and time-elapsed calculations, such that the feature vectors for different sparsity pattern classifications have different structural compositions;

train a machine learning model using the generated feature vectors; and deploy the trained machine learning model, wherein to deploy includes to:

receive new time series data for prediction;

classify the new time series data into one of the sparsity pattern classifications using the rolling window; and route the new time series data to a corresponding trained machine learning model based on the classification sparsity pattern classification of the new time series data to generate predictions.

2. The set of one or more non-transitory computer readable media of claim 1, wherein to analyze sparsity characteristics includes to:

calculate a percentage of missing values within the rolling window;

measure regularity of observation intervals; and identify burst patterns in the temporal data points.

3. The set of one or more non-transitory computer readable media of claim 2, wherein the sparsity pattern classification comprises:

a dense pattern for data sequences having less than twenty percent missing values;

a sparse pattern for data sequences having more than seventy percent missing values; and an in-between pattern for data sequences having missing values between the twenty percent missing values of the dense pattern and the seventy percent missing values of the sparse pattern.

4. The set of one or more non-transitory computer readable media of claim 1, wherein the encoding strategy for dense patterns comprises:

calculating moving averages across multiple time windows;

computing exponential moving averages with varying decay factors; and determining volatility measures for the temporal data points.

5. The set of one or more non-transitory computer readable media of claim 4, wherein the encoding strategy for sparse patterns comprises:

extracting a most recent measurement value;

calculating time elapsed since the most recent measurement; and generating binary indicators for presence of measurements within predefined time periods.

6. The set of one or more non-transitory computer readable media of claim 5, wherein the encoding strategy for burst patterns comprises:

computing statistical measures within individual burst periods;

determining time gaps between consecutive burst periods; and calculating trend indicators within each burst period.

7. The set of one or more non-transitory computer readable media of claim 1, wherein to train a machine learning model includes to:

partition the generated feature vectors into separate datasets based on the sparsity pattern classification;

train individual models for each sparsity pattern classification; and deploy the individual models for prediction based on the sparsity pattern classification of new data sequences.

8. A system comprising:

a processor set comprising one or more processors;

a memory set storing instructions that, when executed by one or more processors of the processor set, cause the processor set to:

obtain time series data comprising a plurality of data sequences with varying degrees of sparsity;

categorize each data sequence into one of a plurality of sparsity pattern classifications based on analysis of data availability within a predetermined time window;

apply different feature engineering techniques to data sequences based on their respective sparsity pattern classifications, wherein dense data sequences receive a first set of feature engineering techniques and sparse data sequences receive a second set of feature engineering techniques different from the first set;

generate training datasets corresponding to each sparsity pattern classification;

wherein the training datasets corresponding to dense data sequences comprise feature vectors containing moving averages and volatility measures, and the training datasets corresponding to sparse data sequences comprise feature vectors containing most recent measurement values and time-elapsed calculations, such that the training datasets corresponding to different sparsity pattern classifications contain feature vectors with different structural compositions;

deploy separate machine learning models trained on the training datasets corresponding to each sparsity pattern classification, wherein to deploy includes to:

receive new time series data for prediction;

classify the new time series data into one of the plurality of sparsity pattern classifications; and route the new time series data to a corresponding deployed machine learning model based on the sparsity pattern classification of the new time series data to generate predictions.

9. The system of claim 8, wherein to categorize each data sequence includes to:

calculate a percentage of missing values within the predetermined time window;

determine regularity of temporal intervals between data points; and identify presence of burst patterns characterized by clusters of measurements separated by extended gaps.

10. The system of claim 9, wherein the plurality of sparsity pattern classifications comprises:

a dense classification for data sequences having less than twenty percent missing values;

a sparse classification for data sequences having greater than seventy percent missing values; and an intermediate classification for data sequences having missing values between the twenty percent missing values of the dense classification and the seventy percent missing values of the sparse classification.

11. The system of claim 10, wherein the first set of feature engineering techniques for dense data sequences comprises:

computing moving averages across multiple temporal windows;

calculating exponential moving averages with different decay parameters; and determining volatility measurements for the data points.

12. The system of claim 11, wherein the second set of feature engineering techniques for sparse data sequences comprises:

extracting a most recent available measurement;

calculating elapsed time since the most recent measurement; and generating binary presence indicators for measurements within specified time intervals.

13. The system of claim 8, wherein the memory set stores further instructions that, when executed by one or more processors of the processor set, cause the processor set to:

receive new time series data for prediction;

classify the new time series data into one of the plurality of sparsity pattern classifications; and apply a corresponding machine learning model based on the sparsity pattern classification of the new time series data to generate predictions.

14. The system of claim 13, wherein to apply the corresponding machine learning model includes to:

select the machine learning model trained on the training dataset corresponding to the sparsity pattern classification of the new time series data; and process feature vectors generated from the new time series data using feature engineering techniques corresponding to the sparsity pattern classification.

15. A method comprising:

receiving time series data having irregular sampling patterns and missing values across multiple data sequences;

performing sparsity pattern analysis on each data sequence using a rolling window approach to classify each data sequence as a sparsity pattern classification of dense, sparse, or intermediate based on data availability metrics;

selecting adaptive encoding strategies for each data sequence based on the sparsity pattern classification, wherein the adaptive encoding strategies comprise different feature extraction techniques optimized for the respective sparsity patterns;

generating feature matrices from the time series data using the selected adaptive encoding strategies;

wherein feature matrices generated for dense data sequences comprise moving averages and volatility measures, and feature matrices generated for sparse data sequences comprise most recent measurement values and time-elapsed calculations, such that the feature matrices for different sparsity pattern classifications have different structural compositions;

training predictive models using the generated feature matrices to enable prediction on heterogeneous time series data with varying sparsity characteristics; and deploying the trained predictive models, wherein deploying includes:

receiving new time series data for prediction;

classifying the new time series data into one of the sparsity pattern classifications using the rolling window approach; and routing the new time series data to a corresponding trained predictive model based on the sparsity pattern classification of the new time series data to generate predictions.

16. The method of claim 15, wherein performing sparsity pattern analysis includes:

calculating a percentage of missing values within a rolling window of the rolling window approach;

measuring regularity of temporal intervals between consecutive data points; and identifying burst patterns characterized by clusters of measurements separated by extended time gaps.

17. The method of claim 16, wherein the data availability metrics comprise:

a dense classification for data sequences having less than twenty percent missing values;

a sparse classification for data sequences having greater than seventy percent missing values; and an intermediate classification for data sequences having missing values between the twenty percent missing values of the dense classification and the seventy percent missing values of the sparse classification.

18. The method of claim 17, wherein the adaptive encoding strategies for dense data sequences comprise:

computing moving averages across multiple temporal windows;

calculating exponential moving averages with varying decay parameters; and determining volatility measurements for the temporal data points.

19. The method of claim 18, wherein the adaptive encoding strategies for sparse data sequences comprise:

extracting a most recent available measurement value;

calculating elapsed time since the most recent available measurement value; and generating binary presence indicators for measurements within predefined time intervals.

20. The method of claim 15, wherein training predictive models includes:

partitioning the generated feature matrices into separate training datasets based on the sparsity pattern classification;

training individual machine learning models for each sparsity pattern classification; and deploying the individual machine learning models for making predictions on new time series data based on the sparsity pattern classification of the new time series data into corresponding sparsity patterns.

21. The set of one or more non-transitory computer readable media of claim 1, wherein the generated feature vectors are fixed-length, fully-populated numerical representations that enable downstream machine learning models to process the feature vectors without requiring specialized handling of missing values or irregular sampling patterns.

22. The set of one or more non-transitory computer readable media of claim 7, wherein the instructions further cause the processor set to re-evaluate the sparsity pattern classifications of the data sequences within rolling windows and update model assignments as data sequences transition between the different sparsity pattern classifications.

23. The system of claim 8, wherein the feature vectors within the training datasets are fixed-length, fully-populated numerical representations that enable the separate machine learning models to process the feature vectors without requiring specialized handling of missing values or irregular sampling patterns.

24. The system of claim 13, wherein the memory set stores further instructions that, when executed by one or more processors of the processor set, cause the processor set to re-evaluate the sparsity pattern classifications of the new time series data within rolling windows and update model assignments as data sequences transition between the different sparsity pattern classifications.

25. The method of claim 15, wherein the generated feature matrices comprise fixed-length, fully-populated numerical representations that enable the predictive models to process the feature matrices without requiring specialized handling of missing values or irregular sampling patterns.

26. The method of claim 20, further comprising re-evaluating the sparsity pattern classifications of the data sequences within rolling windows and updating model assignments as data sequences transition between the different sparsity pattern classifications.

27. The set of one or more non-transitory computer readable media of claim 1, wherein to train the machine learning model includes to concatenate the feature vectors from the different sparsity pattern classifications into unified feature matrices, wherein each data sequence has valid values for features corresponding to its sparsity pattern classification and other features are marked as masked, and process the unified feature matrices using a tree-based boosting model that handles the masked features through internal splitting algorithms.

28. The set of one or more non-transitory computer readable media of claim 1, wherein to train the machine learning model includes to process the feature vectors from the different sparsity pattern classifications simultaneously using an attention-based model with multi-head attention architectures that selectively focus on relevant features within the feature vectors from different sparsity pattern classifications.

29. The system of claim 8, wherein to deploy the separate machine learning models includes to concatenate the feature vectors within the training datasets from the different sparsity pattern classifications into unified feature matrices, wherein each data sequence has valid values for features corresponding to its sparsity pattern classification and other features are marked as masked, and process the unified feature matrices using a tree-based boosting model that handles the masked features through internal splitting algorithms.

30. The system of claim 8, wherein to deploy the separate machine learning models includes to process the feature vectors within the training datasets from the different sparsity pattern classifications simultaneously using an attention-based model with multi-head attention architectures that selectively focus on relevant features within the feature vectors from the different sparsity pattern classifications.

* * * * *